(12) United States Patent
Yoneda et al.

(10) Patent No.: US 7,881,829 B2
(45) Date of Patent: Feb. 1, 2011

(54) MASS FLOW CONTROLLER

(75) Inventors: Yutaka Yoneda, Kyoto (JP); Akito Takahashi, Kyoto (JP)

(73) Assignee: Horiba Stec Co., Ltd., Kyoto (JP)

( * ) Notice: Subject to any disclaimer, the term of this patent is extended or adjusted under 35 U.S.C. 154(b) by 737 days.

(21) Appl. No.: 11/815,818

(22) PCT Filed: Jun. 1, 2007

(86) PCT No.: PCT/JP2007/061183

§ 371 (c)(1),
(2), (4) Date: Aug. 8, 2007

(87) PCT Pub. No.: WO2008/041390

PCT Pub. Date: Apr. 10, 2008

(65) Prior Publication Data

US 2009/0312876 A1   Dec. 17, 2009

(30) Foreign Application Priority Data

Oct. 3, 2006   (JP) ............................. 2006-272315

(51) Int. Cl.
*G05D 7/06* (2006.01)
*G05D 16/20* (2006.01)

(52) U.S. Cl. .................... 700/282; 700/301; 137/87.03; 137/486

(58) Field of Classification Search ................. 700/28, 700/42, 46, 281, 282, 289, 301; 137/2, 7, 137/8, 12, 87.03, 87.04, 87.06, 486, 487, 137/487.5, 488; 702/45, 47, 50, 100; 73/1.16, 73/1.31, 1.35, 23.2, 23.24, 30.02, 30.03
See application file for complete search history.

(56) References Cited

U.S. PATENT DOCUMENTS 5,062,446 A * 11/1991 Anderson ................... 137/468
6,152,168 A * 11/2000 Ohmi et al. ............. 137/487.5

(Continued)

FOREIGN PATENT DOCUMENTS

JP   61-243505   10/1986

(Continued)

*Primary Examiner*—Charles R Kasenge
(74) *Attorney, Agent, or Firm*—Sughrue Mion, PLLC

(57) ABSTRACT

This invention provides a mass flow controller that can prevent a flow rate change due to a pressure change without sacrificing the speed of response to a change of a flow rate setting value and can be used in a system that can generate a crosstalk.

In order to provide the mass flow controller, the mass flow controller has: a control section 5 that calculates an opening control signal to be supplied to a flow rate control valve based on a predetermined calculation formula including at least a flow rate measurement value and a flow rate setting value as parameters and outputs the opening control signal; and a pressure sensor section 4 that measures pressure of a fluid on the upstream side or the downstream side of a flow rate sensor section 2 and outputs a pressure detection signal indicating the pressure value. The control section 5 uses different calculation formulas for a changing period, which is a predetermined period from a point in time when the flow rate setting value changes by a predetermined amount or more, and a stable period, which is the remaining period, and at least in the stable period, the calculation formula further includes the pressure value as a parameter.

10 Claims, 10 Drawing Sheets

U.S. PATENT DOCUMENTS

| | | | |
|---|---|---|---|
| 6,782,906 B2 * | 8/2004 | Chang | 137/486 |
| 6,913,031 B2 * | 7/2005 | Nawata et al. | 137/12 |
| 6,962,164 B2 * | 11/2005 | Lull et al. | 137/2 |
| 6,973,375 B2 * | 12/2005 | Brodeur et al. | 700/282 |
| 7,073,392 B2 * | 7/2006 | Lull et al. | 702/50 |
| 7,231,931 B2 * | 6/2007 | Lull et al. | 137/2 |
| 7,273,063 B2 * | 9/2007 | Lull et al. | 137/12 |
| 7,380,564 B2 * | 6/2008 | Lull et al. | 137/1 |
| 7,603,186 B2 * | 10/2009 | Smirnov | 700/282 |
| 7,610,117 B2 * | 10/2009 | Brodeur et al. | 700/281 |
| 7,640,078 B2 * | 12/2009 | Smirnov | 700/282 |

FOREIGN PATENT DOCUMENTS

| | | |
|---|---|---|
| JP | 62-83670 | 4/1987 |
| JP | 63-140301 | 6/1988 |
| JP | 01-125579 | 5/1989 |
| JP | 2004-280689 A | 10/2004 |
| JP | 2004-302914 | 10/2004 |
| JP | 2006-003327 | 1/2006 |

* cited by examiner

MASS FLOW CONTROLLER

FIELD OF THE ART

The present invention relates to a mass flow controller that controls a flow rate of a fluid, such as gas and liquid.

BACKGROUND ART

For example, in a semiconductor manufacturing apparatus to which various kinds of gas used for manufacturing a semiconductor are supplied, a mass flow controller is provided for each gas supply channel to adjust the flow rate of the gas. Conventionally, a pressure regulator is connected in series to each mass flow controller for preventing an extreme change in pressure in the channel to which the mass flow controller is attached, thereby facilitating flow rate control.

A basic flow rate control method for the mass flow controller is the PID control. For example, there has been known a feed back control based on a variation of the PID control disclosed in the patent document 1. Specifically, according to the method disclosed in the patent document 1, the feed back control value is calculated by performing a PID calculation on the deviation and multiplying the calculation result by a function whose value increases as the flow rate setting value decreases.

Recently, a system configuration has become popular in which a regulator is provided only for a fluid supply source, such as a cylinder, rather than for each supply channel, although the mass flow controller is provided for each supply channel divaricated from the fluid supply source.

However, for example, this system configuration has the following disadvantage. That is, if one of the supply channels is suddenly closed, or the flow rate of one of the mass flow controllers is largely changed, the resulting pressure change affects the other supply channel or mass flow controllers (this is referred to as a crosstalk). As a result, the conventional control method based on the assumption that the pressure regulator controls the pressure change to some extent cannot achieve adequate flow rate control.

More specifically, in the case where the control method disclosed in the patent document 1 is used, if the pressure on the primary side (the pressure on the upstream side of the mass flow controller (a flow rate sensor section) changes beyond a certain level, the flow rate excessively responds to the change of the pressure and changes beyond a prescribed level.

Such a problem of flow rate change due to the pressure change is caused not only by the crosstalk but also by other factors. In addition, such a problem occurs not only when the pressure on the primary side changes but also when the pressure on the secondary side changes.

However, under the current circumstance in which higher speed and precision are needed in the control of the raw material gas or the like used in semiconductor processes, the speed of following the change of the flow rate setting value (the speed of response) cannot be sacrificed to suppress the excessive response described above.

Patent Document 1 Japanese Patent Laid-Open No. 2004-280689

DISCLOSURE OF THE INVENTION

Problems to be Solved by the Invention

Thus, a main object of the present invention is to provide a mass flow controller that can prevent a flow rate change due to a pressure change caused by a crosstalk or the like without sacrificing the speed of following the change of the flow rate setting value.

Means to Solve the Problems

Specifically, a mass flow controller according to the present invention comprises: a flow rate sensor section that measures a flow rate of a fluid flowing through a flow channel and outputs a flow rate measurement signal indicating the measurement value; a flow rate control valve that is disposed on the upstream side or the downstream side of the flow rate sensor section; a control section that calculates an opening control signal to be supplied to the flow rate control valve based on a predetermined calculation formula including at least a flow rate measurement value indicated by the flow rate measurement signal and a flow rate setting value, which is a target value, as parameters and outputs the opening control signal; and a pressure sensor section that detects pressure of the fluid on the upstream side or the downstream side of the flow rate sensor section and outputs a pressure detection signal indicating the pressure value, and is characterized in that the control section uses different calculation formulas for a changing period, which is a predetermined period from a point in time when the flow rate setting value changes by a predetermined amount or more, and for a stable period, which is the remaining period, and that at least in the stable period, the calculation formula further includes the pressure value as a parameter.

The term "a predetermined calculation formula" refers to a calculation formula for feedback-controlling the opening of the control valve using at least the flow rate measurement value and the target value as parameters. For example, a formula including at least a proportional calculation (a PID calculation, preferably) may be used.

Furthermore, for example, the action "the flow rate setting value changes by a predetermined amount or more" may be an instantaneous (one control cycle) change of the flow rate setting value by a predetermined amount or more.

A concrete example of "the different calculation formulas are used" is represented by that different factors such as different gains (a reference character P, to be described later) in a proportional calculation are used for the changing period and the stable period. With this arrangement, for example, the control may be performed so as to ensure a quick response for the valve of the mass flow controller in the changing period and the control may be performed so as to make the valve of the mass flow controller less sensitive to a disturbing noise in the stable period.

In addition, the "the pressure value included in the calculation formula as a parameter" includes a case in which a value related to an actually measured pressure value such as an amount of change (time differential value) of the pressure detected during a predetermined length of time and the time integral value is included in the calculation formula, in addition to a case in which the pressure value itself detected by the pressure sensor section is included in the calculation formula.

In accordance with this arrangement, since control is switched between the stable period and the changing period, in the changing period in which the flow rate setting value changes, for example, the control is performed with a higher speed of response so that the actual flow rate can quickly follow the changed flow rate setting value. On the other hand, in the stable period in which the flow rate setting value does not change significantly, for example, the control is performed with a higher stability so that the flow rate can be prevented from being significantly affected by and excessively responding to any pressure change that occurs on the primary side or the like (a pressure change occurs on the upstream side of the mass flow controller (the flow rate sensor section)) so that the actual flow rate can be stabilized.

At least in the stable period, the predetermined calculation formula at least including the flow rate measurement value and the flow rate setting value further includes the pressure value obtained by the pressure sensor section as a parameter. Therefore, in the stable period in which the flow rate change due to the pressure change particularly becomes a problem, the actual flow rate can be further stabilized against the pressure change.

More specifically, it is possible to provide an excellent mass flow controller that can effectively suppress a flow rate change due to a pressure change without sacrificing the speed of response to a change of the flow rate setting value and that can be adopted in a system that can generate a disturbance, such as a crosstalk.

The changing period may always be constant or may be changed in duration in order to improve the control stability as required. As an example, it is represented that the changing period is terminated at a time when the deviation of the flow rate measurement value from the flow rate setting value decreases to fall within a certain range.

The calculation formula including the pressure value (time differential value) according to the present invention may use a formula in which the pressure time differential value is added to, subtracted from, multiplied by or divided by the result of the PID calculation based on the deviation $\epsilon$ of the flow rate measurement value from the flow rate setting value, more specifically, a formula expressed by the following formula (a) or formula (b).

$$V = P \cdot \epsilon + I \int \epsilon \cdot \delta t + D \cdot \delta \epsilon / \delta t + Y \cdot \Delta p \quad (a)$$

$$V = (P \cdot \epsilon + I \int \epsilon \cdot \delta t + D \cdot \delta \epsilon / \delta t) \cdot Y \cdot \Delta p \quad (b)$$

In case, $\epsilon = S - OUT$

Where a reference character V denotes a feed back control value, based on which the opening control signal is set. Reference characters P, I, D and Y denote factors appropriately determined respectively. A reference character S denotes the flow rate setting value, and a reference character OUT denotes the flow rate measurement value. A reference character $\Delta p$ denotes the time differential value of the pressure value obtained by the pressure sensor section or a value expressed by a formula including the time differential value.

In addition to this, as the calculation formula represented is a formula wherein the pressure time differential value is added to as a parameter in case of calculating the deviation itself. This formula is expressed by the following formula (c).

$$V = P \cdot \epsilon' + I \int \epsilon' \cdot \delta t + D \cdot \delta \epsilon' / \delta t \quad (c)$$

In this formula, $\epsilon' = h(S, OUT, \Delta p)$ where a reference character h is a function including at least S, OUT, and $\Delta p$ as parameters.

As a concrete example of the above-mentioned function h conceived is a formula wherein the pressure time differential value is added to, subtracted from, multiplied by or divided by at least either one of the flow rate measurement value and the flow rate setting value, more specifically, a formula expressed by the following formulas (d), (e), (f) and (g).

$$\epsilon' = S - (OUT + X \cdot \Delta p) \quad (d)$$

$$\epsilon' = S - (OUT \cdot X \cdot \Delta p) \quad (e)$$

$$\epsilon' = S \cdot X \cdot \Delta p - OUT \quad (f)$$

$$\epsilon' = (S - X \cdot \Delta p) - OUT \quad (g)$$

where X denotes a factor appropriately determined.

On the contrary, conventionally, there is a case in which the flow rate indicative value output from the mass flow controller for external use indicates a value different from the actual flow rate measured on the downstream side (or the upstream side) because of a mutual interference with the control of the flow rate control valve that is excessively sensitive to a pressure change on the primary side.

In order to stabilize the flow rate indicative value and bring the flow rate indicative value close to the actual flow rate value by improving the opening control algorithm for the flow rate control valve described above, it is preferable that a flow rate output section that performs a predetermined calculation on the flow rate measurement value and outputs the result as the flow rate indicative value is provided, and the flow rate output section is configured to use different calculation formulas on the flow rate measurement value for the changing period and the stable period.

With this arrangement, the indicative value can also be stabilized according to the actual flow rate.

As a concrete example it is represented that, in the stable period, the flow rate measurement value is smoothed with respect to time and the result is output, and in the changing period, the flow rate measurement value is output without being processed.

In addition, the flow rate indicative value may be calculated from the flow rate measurement value using at least the time differential value of the pressure value detected by the pressure sensor section as a parameter.

Effect of the Invention

As described above, according to the present invention, since the mass flow controller switches the control between the stable period and the changing period, the mass flow controller can suppress a flow rate change without sacrificing the speed of response to a change of the flow rate setting value even if a pressure change occurs and can be applied to a system that may generate a disturbance such as a crosstalk. Furthermore, even if the pressure change occurs in the stable period in which a flow rate change due to a pressure change particularly becomes a problem, the actual flow rate can be further stabilized against the pressure change, because the value control is performed based on the opening control signal determined by the calculation formula including at least the flow rate measurement value and the flow rate setting value as well as the pressure value obtained by the pressure sensor section.

BEST MODES OF EMBODYING THE INVENTION

In the following, embodiments of the present invention will be described with reference to the drawings.

First Embodiment

Figure 1:
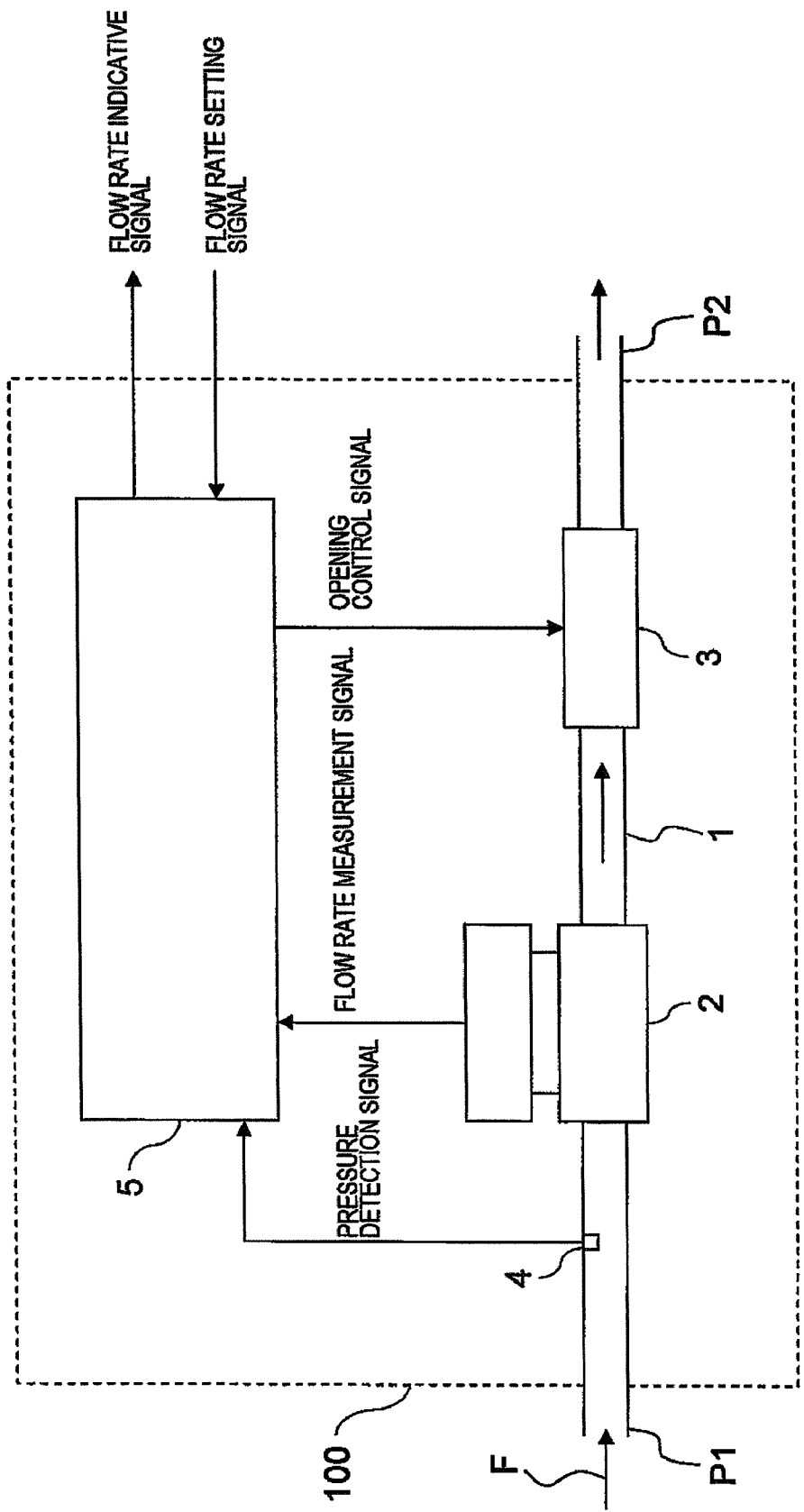
FIG. 1 is a schematic diagram showing the whole of a mass flow controller according to an embodiment of the present invention.
Figure 2:
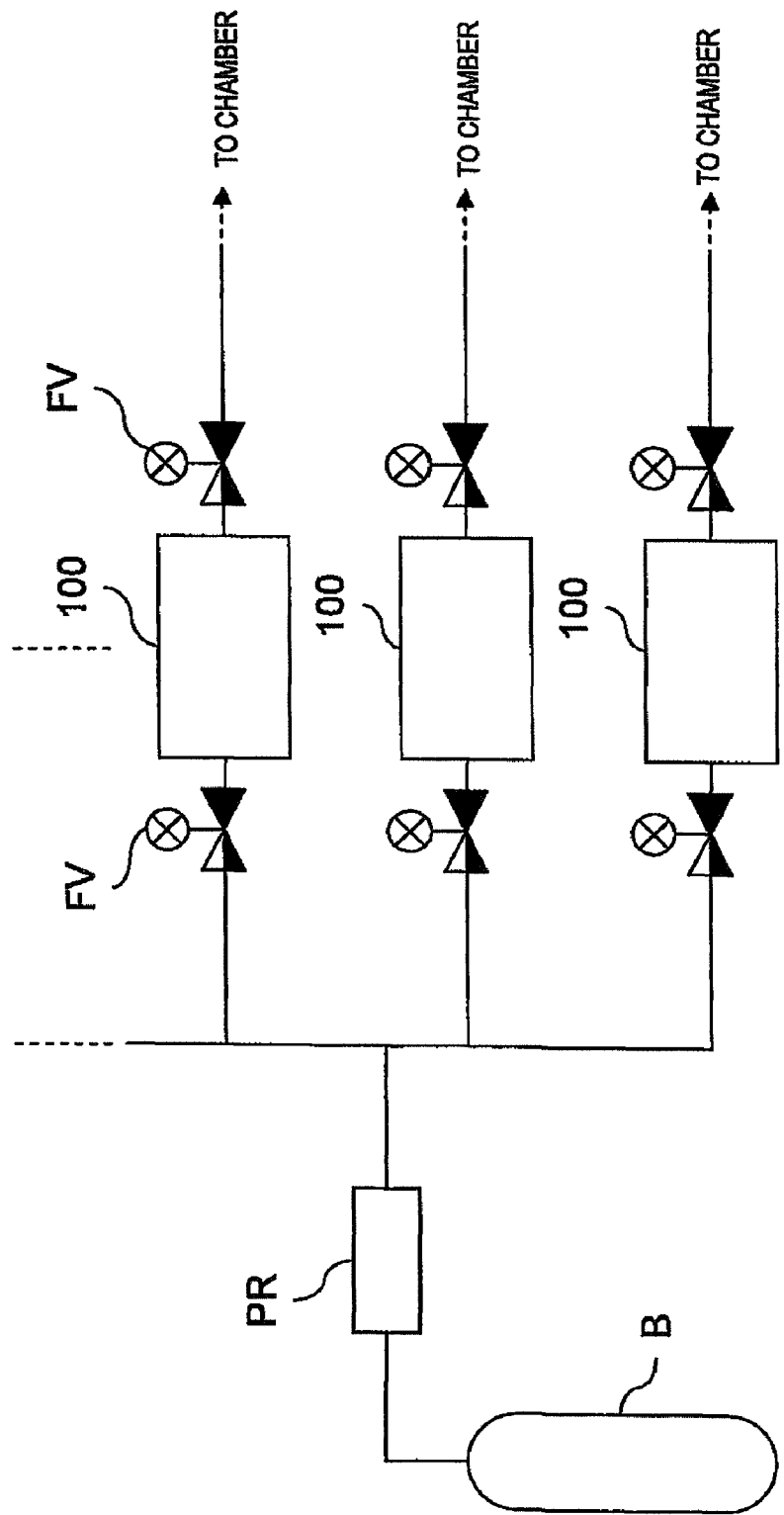
FIG. 2 is a diagram showing an example of a configuration of a flow rate control system by the use of the mass flow controller according to the embodiment.

As shown in the schematic diagram of FIG. 1, a mass flow controller 100 according to an embodiment of the present invention comprises an internal channel 1, a flow rate sensor section 2 that measures the flow rate of a fluid F flowing through the internal channel 1, a flow rate control valve 3 disposed on, for example, a downstream side of the flow rate sensor section 2, a pressure sensor section 4 disposed on, for example, an upstream side of the flow rate sensor section 2 and a control section 5. The mass flow controller 100 is used, for example, in a gas supply system that supplies gas to a chamber in a semiconductor process as shown in FIG. 2.

Now, each component will be described. The internal channel 1 has an inlet port P1 on the upstream side and an outlet port P2 on the downstream side. For example, the inlet port P1 is connected to a fluid supply source B, such as a cylinder, via an external pipe, and the outlet port P2 is connected to a chamber (not shown in drawings) for manufacturing semiconductor via an external pipe. In this embodiment, as shown in FIG. 2, a pipe connected to one fluid supply source B is branched, and each of the branched pipes is provided with one mass flow controller 100. Furthermore, a pressure regulator PR is provided only at the outlet of the fluid supply source B (before the branch point to each pipe), and no pressure regulator for the mass flow controller 100 is provided for each pipe. A reference character FV denotes an air pressure valve.

Although details are not shown, the flow rate sensor section 2 has a pair of heat-sensitive sensors (thermal sensors) disposed in the internal channel 1, for example. The thermal sensors measures the instantaneous flow rate of the fluid F as an electric signal, performs amplification or the like on the electric signal by an internal electric circuit and outputs a flow rate measurement signal having a value depending on the measured flow rate.

Although details are not shown, the flow rate control valve 3 can change the opening by means of, for example, an actuator constituted by a piezoelectric element or the like. The flow rate control valve 3 drives the actuator in response to an opening control signal, which is an electric signal supplied externally, and adjusts the opening in accordance with the value of the opening control signal, thereby controlling the flow rate of the fluid F.

Although details are not shown, the pressure sensor section 4 is disposed on the upstream side of the flow rate sensor section 2 and is constituted by a pressure transducer, for example. The pressure sensor section 4 samples and detects the pressure of the fluid F at predetermined time intervals, such as every several milliseconds, and outputs the value of the detected pressure, as a pressure detection signal, to the control section 5.

The control section 5 is composed of a digital or analog electric circuit comprising a CPU, a memory, an A/D converter, a D/A converter and the like, not shown. The control section 5 may be a dedicated one or partially or wholly composed of a general-purpose computer, such as a personal computer. Furthermore, the CPU may be omitted, and the functions of the remaining parts may be implemented only by an analog circuit. Furthermore, the control section 5 may not be a physically integral unit but may be composed of a plurality of devices interconnected by wires or wirelessly.

Figure 3:
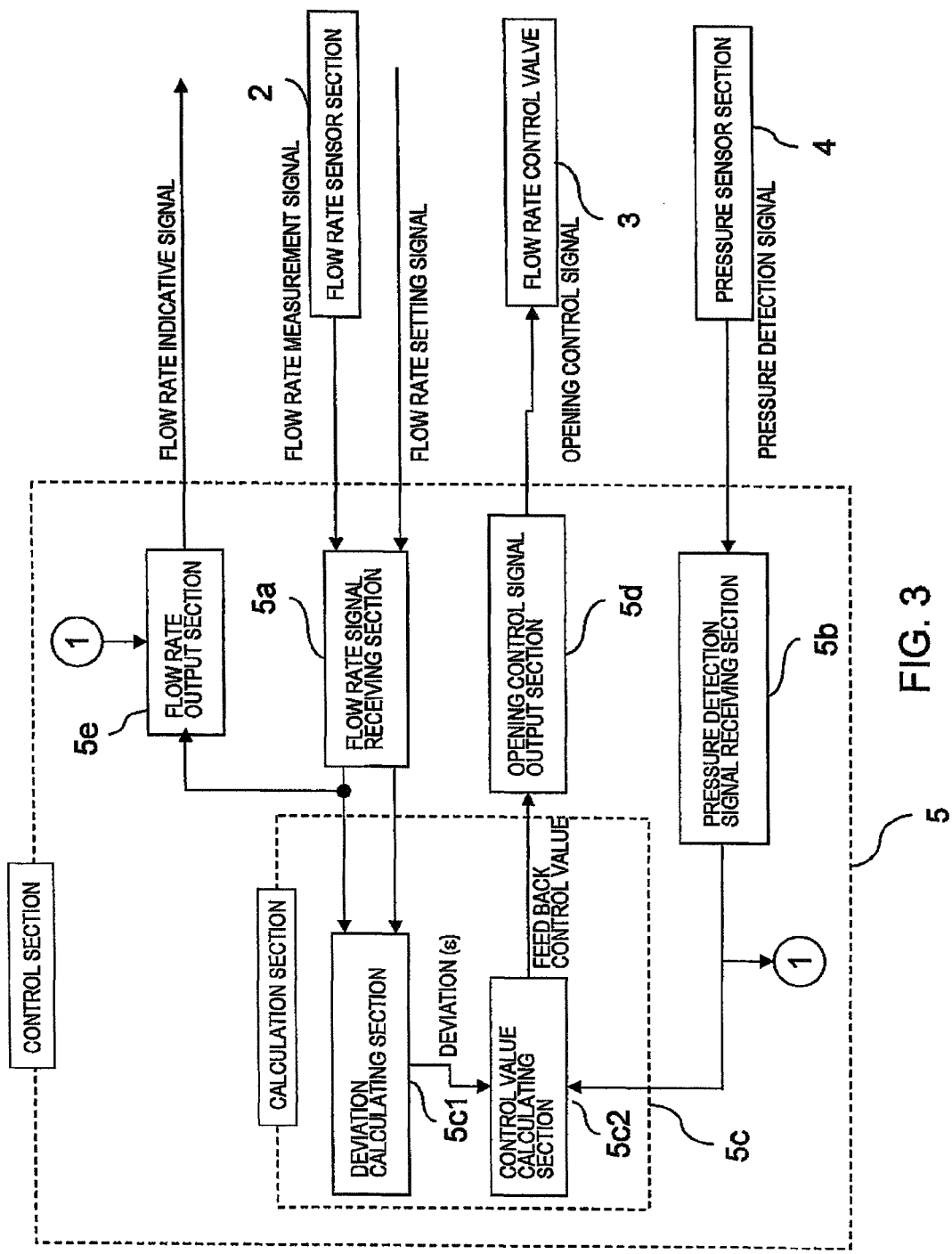
FIG. 3 is a functional block diagram of a control section according to the embodiment.

A predetermined program is stored in the memory, and the CPU and a peripheral device thereof are operated in cooperation with each other in accordance with the program. Thus, as shown in FIG. 3, the control section 5 performs at least the functions of a flow rate signal receiving section 5a, a pressure detection signal receiving section 5b, a calculation section 5c, an opening control signal output section 5d and a flow rate output section 5e.

The flow rate signal receiving section 5a receives the flow rate measurement signal sent from the flow rate sensor section 2, a flow rate setting signal input from another computer or the like, and stores the values of the signals in a predetermined region in the memory, for example.

The pressure detection signal receiving section 5b receives the pressure detection signal sent from the pressure sensor section 4 and stores the value of the signal in a predetermined region in the memory, for example.

The calculation section 5c has a deviation calculating section 5c1 that obtains the flow rate measurement value indicated by the flow rate measurement signal and calculates the deviation of the flow rate measurement value from the flow rate setting value indicated by the flow rate setting signal and a control value calculating section 5c2 that calculates a feed back control value to be sent to the flow rate control value 3 by performing at least a proportional calculation on the deviation.

A concrete calculation in the calculating section 5c (or the control value calculating section 5c2) will be explained. Here, the feed back control value V is calculated based on the following formula (1).

$$V = P \cdot \epsilon + I \int \epsilon \cdot \delta t + D \cdot \delta \epsilon / \delta t + Y \cdot \Delta p \qquad (1),$$

In case, $\epsilon = S - OUT$

Where $\epsilon$ denotes the deviation and the reference characters P, I, D and Y denote factors for adjustment (adjustment factors) including 0 appropriately determined respectively. There is a case in which the reference characters D and Y might not include 0. A reference character S denotes the flow rate setting value, and a reference character OUT denotes the flow rate measurement value respectively. A reference character $\Delta P$ denotes a time differential value of the pressure value p obtained by the pressure sensor section 4.

The opening control signal output section 5d generates an opening control signal having a value corresponding to the feed back control value and outputs the opening control signal to the flow rate control valve 3.

The flow rate output section 5e calculates a flow rate indicative value by performing a predetermined calculation on the flow rate measurement value and outputs a flow rate indicative signal (analog or digital) representing the flow rate indicative value to a display screen or the like for the purpose of external use.

Meanwhile, according to this embodiment, the control value calculating section 5c2 classifies a changing period (for example, about several seconds, and more concretely about 0~10 seconds and more preferably about 0.3~5 seconds), which is a certain period from a point in time when the flow rate setting value changes by a predetermined amount (for example, about 0~10 percentage and more preferably 0.3~5 percentage with respect to a full scale) or more in a unit of time and a stable period, which is a remaining period, and calculates the feed back control value from the deviation by the use of the above-described formula (1) in which the adjustment factors are varied for the changing period and the stable period.

First, the calculation formula in the changing period will be explained. In the changing period, the control value calculating section $5c2$ expresses the gain (the factor) P to be multiplied by the deviation $\epsilon$ in the proportional calculation term of the formula (1) by a function having the flow rate setting value as the parameter so that the function is different between the changing period and the stable period.

A function f1 used for the changing period (referred to also as a first function in the following for the purpose of differentiation) is a function that returns a greater value as the flow rate setting value to be substituted decreases. In this embodiment, the function is expressed by the following formula (2), for example.

$$f1(S)=(100+K1)/(K1+S)(=P) \quad (2)$$

In this formula, a reference character S denotes the flow rate setting value (in percentage with respect to a full scale), and a reference character K1 denotes an adjustment factor.

Furthermore, Y=0 and an influence from the pressure is disregarded in the changing period, however, an influence from the pressure may be considered by giving a value other than zero to the reference character Y.

On the contrary, a function f2 in the stable period (referred to also as a second function in the following for the purpose of differentiation) is a function that returns a smaller value as the flow rate setting value to be substituted decreases. In this embodiment, the function is expressed by the following formula (3), for example.

$$f2(S)=S \cdot K2+d(=P) \quad (3)$$

In this formula, a reference character S denotes the flow rate setting value (in percentage with respect to a full scale), a reference character K2 denotes an adjustment factor, and a reference character d denotes an offset constant.

In addition, in the stable period, if the pressure value indicated by the pressure detection signal from the pressure sensor section 4 changes by a predetermined amount (10 kPa or more, for example) or more in a unit of time, the control is performed with further considering the pressure value (more concretely, the time differential value of the pressure value) by giving a value other than zero to the reference character Y in the formula (1).

Furthermore, in this embodiment, the flow rate output section $5e$ determines the flow rate indicative values for the changing period and the stable period by performing different calculations on the flow rate measurement value and outputs the flow rate indicative values as the flow rate indicative signals to the outside. Specifically, in the stable period, the flow rate output section $5e$ outputs the flow rate indicative value that is determined by smoothing the flow rate measurement value with respect to time. In the changing period, the flow rate output section $5e$ outputs the flow rate measurement value as the flow rate indicative value without processing.

Furthermore, in this embodiment, if the pressure value indicated by the pressure detection signal from the pressure sensor section 4 changes by a predetermined amount (10 kPa or more, for example) or more in a unit of time at least in the stable period, the flow rate measurement value is corrected with the pressure value, more specifically the time differential value of the pressure value, a moving average that is specific to the stable period is taken, and the flow rate indicative value smoothed with respect to time is determined and then output.

An actual flow rate indicative value is calculated by the use of the following formula (4).

$$MFCOUT=(OUT_{new}-MFCOUT\_OLD) \cdot Z+MFCOUT\_OLD \quad (4)$$

Where $OUT_{new}=OUT+1 \cdot \Delta p$

In this formula, a reference character MFCOUT denotes the latest flow rate indicative value calculated with a current control cycle, a reference character MFCOUT_OLD denotes a previous flow rate indicative value calculated in the previous control cycle, and a reference character Z denotes an adjustment factor. In addition, $OUT_{new}$ denotes the flow rate measurement value after corrected based on the pressure (hereinafter called also as the corrected flow rate measurement value), a reference character OUT denotes the latest flow rate measurement value actually sampled, a reference character $\Delta p$ denotes the time differential value of the pressure value detected by the pressure sensor section, and the reference character Y1 denotes the adjustment factor. Y1 may be the same value as that of the reference character Y or may be different from the value of Y.

In order to smooth the flow rate indicative value with respect to time, $0 \leq z \leq 1$. In order not to smooth the flow rate indicative value with respect to time, $Z=1$. In addition, in case of considering the pressure, a value other than 0 is substituted to Y1. In case not to consider the pressure, 0 is substituted to Y1.

Figure 4:
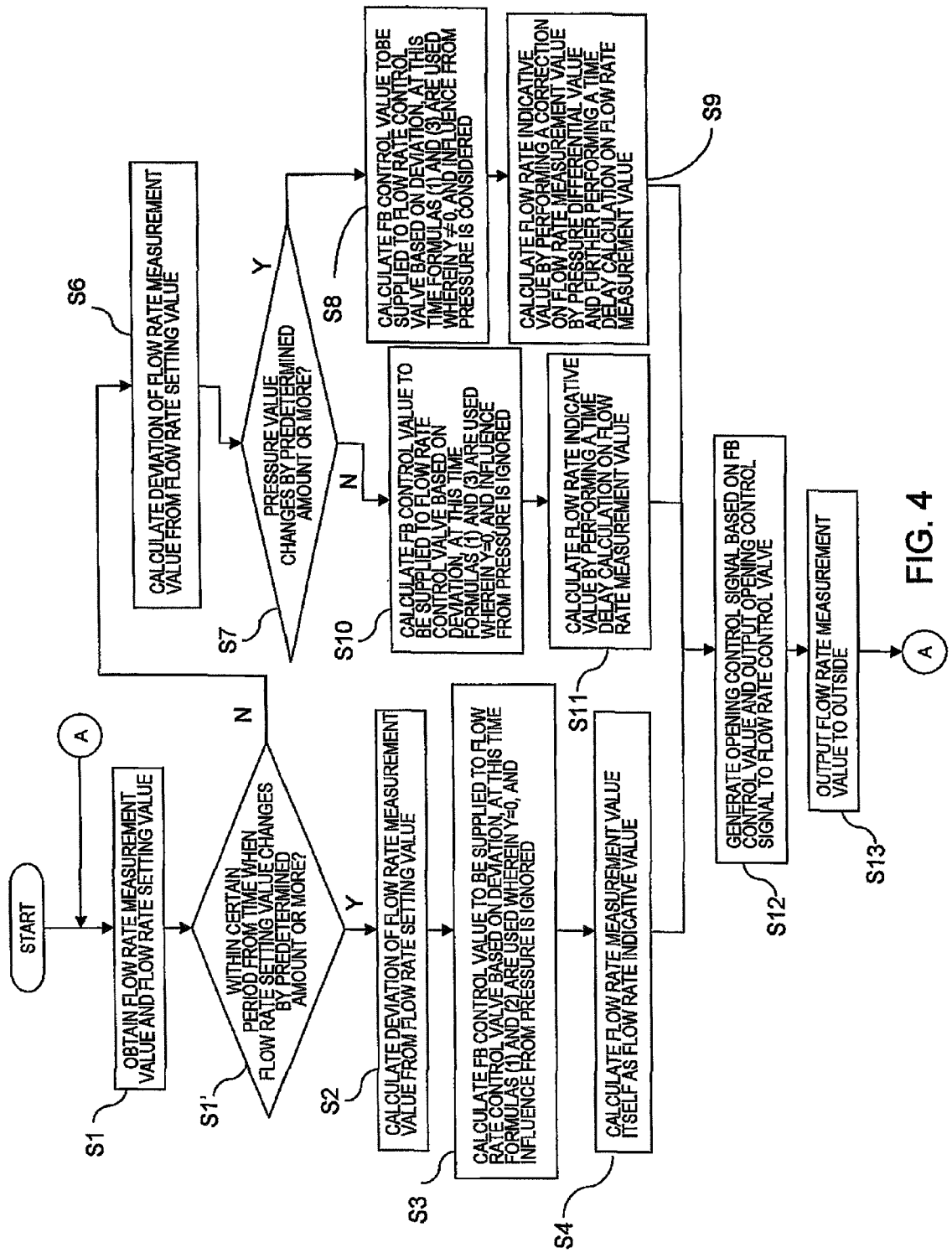
FIG. 4 is a control flow chart according to the embodiment.

Next, an operation of the mass flow controller 100 configured as described above will be explained with reference to the flowchart of FIG. 4, focused primarily on the operation of the control section 5.

The flow rate signal receiving section $5a$ receives the flow rate measurement signal constantly output from the flow rate sensor section 2 and the flow rate setting signal output from dedicated input means or another computer at constant sampling intervals (step S1).

If the flow rate setting value changes by a predetermined amount or more compared with the flow rate setting value at a previous sampling time (step S1'), a certain period (about several seconds) from the point in time of the change is determined as a changing period, and the process proceeds to a step S2. The remaining period is determined as the stable period, and the process proceeds to a step S6.

In the step S2, the deviation calculating section $5c1$ calculates the difference between the value of the flow rate measurement signal (the flow rate measurement value) received by the flow rate signal receiving section $5a$ and the flow rate setting value, which is the value of the flow rate setting signal, or in other words, the deviation $\epsilon$.

Next, the control value calculating section $5c2$ calculates the feed back control value to be supplied to the flow rate control valve 3 by performing the PID calculation on the deviation based on the formula (1). In this step, a value obtained by substituting the flow rate setting value into the first function (formula (2)) is used as the gain (adjustment factor) to be multiplied by the deviation $\epsilon$ in the proportional calculation and the calculation is performed by substituting zero into the reference character Y in the formula (1) (step S3). In other word, the pressure is not considered in this step.

On the other hand, if judged as the stable period (step S1'), as in the step S2, the deviation calculating section $5c1$ calculates the difference between the flow rate measurement value and the flow rate setting value, or in other words, the deviation $\epsilon$ (step S6).

Then, if the pressure value indicated by the pressure detection signal from the pressure sensor section 4 changes by a predetermined amount or more in the stable period (step S7), the control value calculating section 5c2 calculates the feed back control value based on the calculation formula (1) described above (step S8). In this step, a value obtained by substituting the flow rate setting value into the second function (formula (3)) is used as the gain (adjustment factor) to be multiplied by the deviation $\epsilon$ in the proportional calculation and the calculation is performed by substituting a predetermined value other than zero into the reference character Y. In other word, the pressure is considered in this step.

On the other hand, if it is not the case (step S7), the control value calculating section 5c2 calculates the feed back control value also based on the formula (1) (step S10). In this step, a value obtained by substituting the flow rate setting value into the second function (formula (3)) is used as the gain (adjustment factor) to be multiplied by the deviation $\epsilon$ in the proportional calculation and the calculation is performed by substituting zero into the reference character Y with ignoring the pressure change.

Once the feed back control value is thus calculated, the opening control signal output section 5d generates the opening control signal based on the feed back control value, outputs the opening control signal to the flow rate control valve 3, and adjusts the flow rate by changing the opening of the flow rate control valve 3 (step S12).

On the other hand, if we focus attention on an operation of the flow rate output section 5e, in the changing period, the flow rate indicative value is obtained by performing the calculation expressed by the formula (4) on the flow rate measurement value, or in other word, Z=1, Y1=0 so that the flow rate measurement value directly indicates the flow rate indicative value (step S4).

In addition, in the stable period, essentially the flow rate indicative value is determined by smoothing the flow rate measurement value with respect to time, or in other word, by performing the calculation expressed by the formula (4) on the flow rate measurement value on condition that 0<Z≦1, Y1=0 and then the flow rate indicative signal having the flow rate indicative value is output to the outside (step S11).

In the stable period, in case that the pressure value indicated by the pressure detection signal from the pressure sensor section 4 changes by a predetermined amount (10 kPa or more, for example) or more, the flow rate indicative value is determined by correcting the flow rate measurement value with the pressure time differential value and further smoothing the corrected flow rate measurement value with respect to time, or in other word, the calculation expressed by the formula (4) is performed on the flow rate measurement value on condition that 0<Z≦1, Y1≠0 (step S9).

Then, the flow rate indicative signal having the flow rate indicative value thus determined is output to the outside (step S13).

In consequence, since the mass flow controller 100 switches control between the stable period and the changing period, the actual flow rate can extremely quickly follow the changed flow rate setting value in the changing period in which the flow rate setting value changes, and even if a pressure change occurs on the primary side or the like (a pressure change occurs on the upstream side of the mass flow controller 100), an excessive response thereto can be suppressed so that the actual flow rate can be stabilized in the stable period in which the flow rate setting value does not change significantly. In addition, since at least with regard to the stable period, the calculation formula further includes the value of the pressure detected by the pressure sensor section 4 as a parameter, as can be seen from the calculation formula (1), the actual flow rate can be stabilized by following such a pressure change.

Furthermore, since the flow rate measurement value smoothed with respect to time is used as the value (the flow rate indicative value) of the flow rate indicative signal to be output to the outside or the flow rate indicative value is corrected by the use of the pressure value in the stable period, the flow rate indicative value can be stabilized and brought close to the actual flow rate value without excessively responding to the pressure change on the primary side.

Second Embodiment

In the above-mentioned first embodiment, the deviation calculating section 5c1 calculates the deviation of the flow rate measurement value from the flow rate setting value, however, it is not limited to this, and the deviation between the flow rate measurement value or the corrected flow rate measurement value and the flow rate setting value or the corrected flow rate setting value may be calculated.

Now, the second embodiment, wherein the deviation calculating section 51c1 calculates the deviation of the value obtained by correcting the flow rate measurement value by the use of the pressure value from the flow rate setting value, will be described with reference to FIG. 5.

Figure 5:
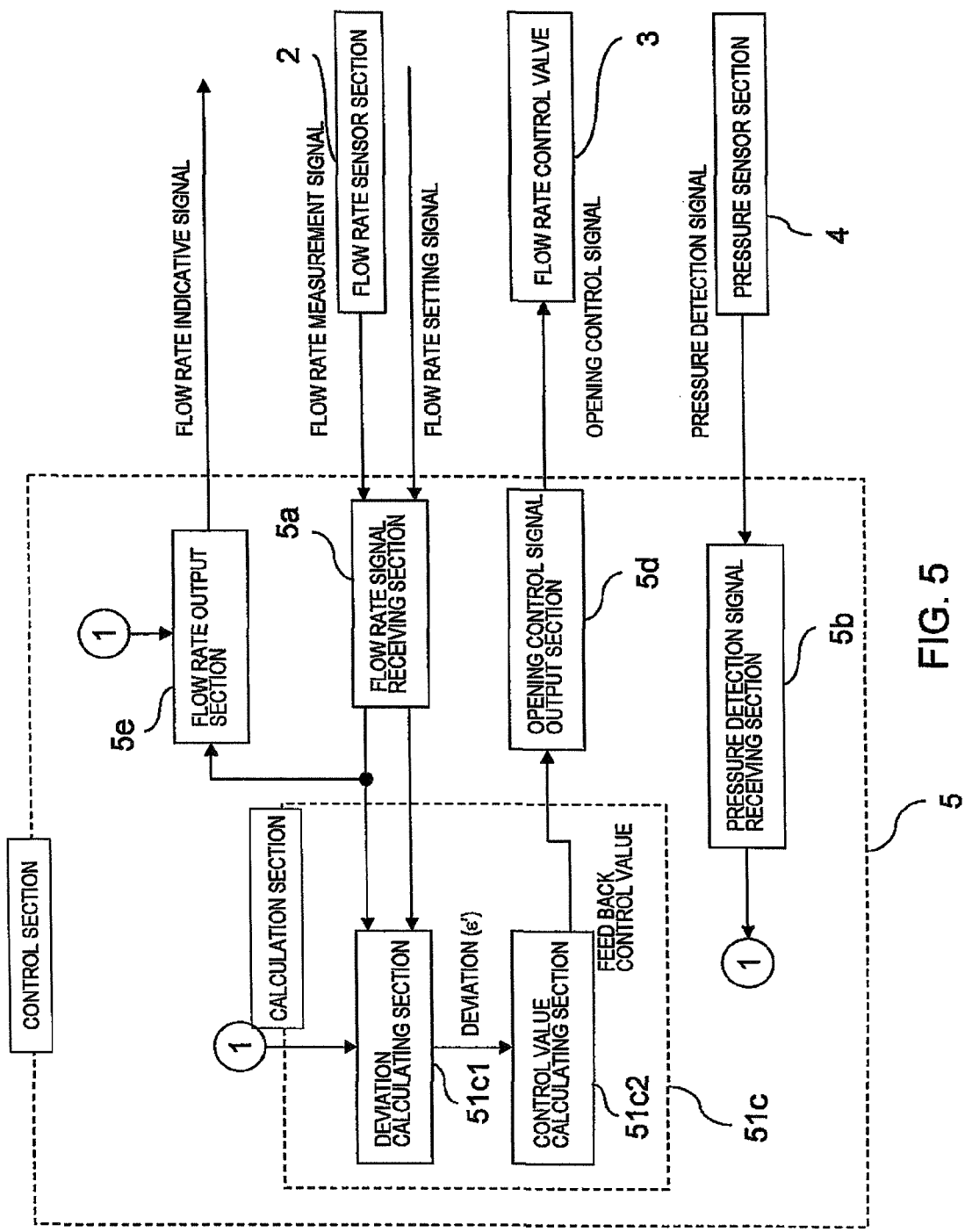
FIG. 5 is a functional block diagram of a control section according to a second embodiment of the present invention.

In FIG. 5, the same parts as those in the first embodiment are denoted by the same reference numerals as those in the embodiment, and descriptions thereof will be omitted. In the following, only differences from the first embodiment will be described.

The deviation calculating section 51c1 first corrects the flow rate measurement value based on the pressure value (time differential value) multiplied by a gain. Specifically, as shown by the following formula (5), a value X·Δp is added to or subtracted from the flow rate measurement value.

$$\text{OUT\_new} = \text{OUT} + X \cdot \Delta p \tag{5}$$

In this formula, a reference character OUT_new denotes the flow rate measurement value corrected based on the pressure (the corrected flow rate measurement value), a reference character OUT denotes the sampled flow rate measurement value, a reference character Δp denotes the differential of the value of the pressure detected by the pressure sensor section, and a reference character X denotes the gain adjusting factor and is a constant value in this formula.

This correction may be performed regardless of whether in the stable period or in the changing period or whether or not the pressure value changes by a predetermined amount or more. As a result, regardless of whether in the stable period or in the changing period, that is, over the entire period, even if a pressure change occurs and the flow rate sensor section 2 outputs a flow rate measurement value affected by the pressure change, the flow rate measurement value can be corrected, and the mass flow controller can perform the valve control appropriate to the actual flow rate of the fluid flowing between the flow rate sensor section 2 and the flow rate control valve 3. This correction may be performed only in the stable period or only when the pressure value changes by a predetermined amount or more in the stable period and/or in the changing period.

Then the deviation calculating section 51c1 calculates the deviation $\epsilon'$ between the corrected flow rate measurement value and the flow rate setting value. The deviation $\epsilon'$ can be expressed by the following formula.

$$\epsilon' = S - \text{OUT\_new}$$
$$= S - (\text{OUT} + X \cdot \Delta p) \quad (6)$$

Next, a control value calculating section 51c2 calculates the feed back control value V to be supplied to the flow rate control valve 3 based on the following formula (7) and transmits the feed back control value to the opening control signal output section.

$$V = P \cdot \epsilon' + I \int \epsilon' \cdot \delta t + D \cdot \delta \epsilon' / \delta t \quad (7)$$

The formula (7) corresponds to the formula (1), and similar to the first embodiment, a factor P in the proportional calculation is calculated based on the formula (2) in the changing period, and the factor P is calculated based on the formula (3) in the stable period.

As described above, according to this embodiment, calculation formulas are set for the stable period and the changing period, wherein the calculation formula includes at least the flow rate measurement value and the flow rate setting value as parameters and further includes the pressure value (time differential value) as a parameter whether or not the pressure value changes by a predetermined value or more, not only in the stable period but also over the entire period, and the opening control value is calculated by the use of the different calculation formulas for the stable period and the changing period.

As described, since the control system is configured that compares the flow rate measurement value corrected based on the pressure value (in particular, the time differential value thereof) with the flow rate setting value to determine the deviation $\epsilon'$ therebetween and performs a PID calculation on the deviation $\epsilon'$, it is possible to prevent occurrence of an unstable valve operation to a maximum, compared to the embodiment described earlier in which a factor of pressure change is directly reflected in the valve operation by including the factor of pressure change in the PID calculation.

In the following, a specific effect according to this second embodiment will be described with regard to a case (i) where the measurement value corrected based on the pressure value is used in the stable period and a case (ii) where the measurement value corrected based on the pressure value is used in the changing period.

Figure 6:
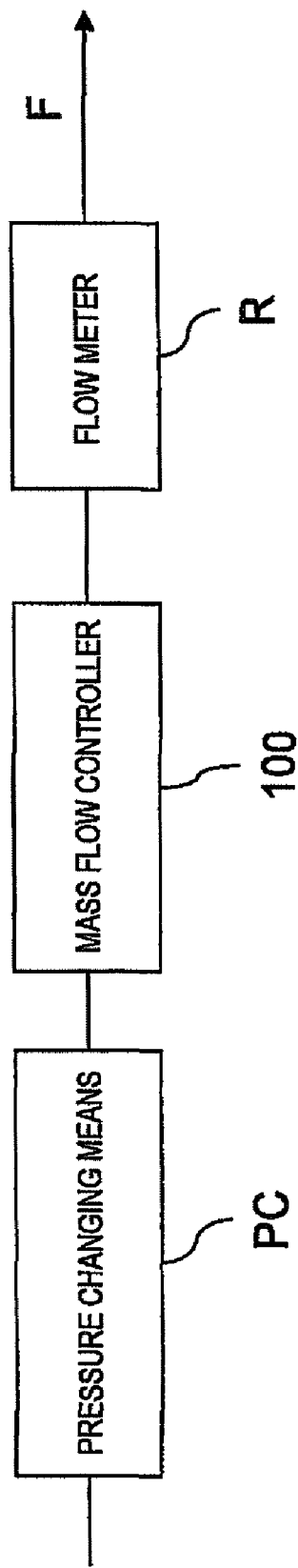
FIG. 6 is a schematic diagram showing the whole of an effect checking and testing system for a mass flow controller according to the embodiment.
Figure 7:
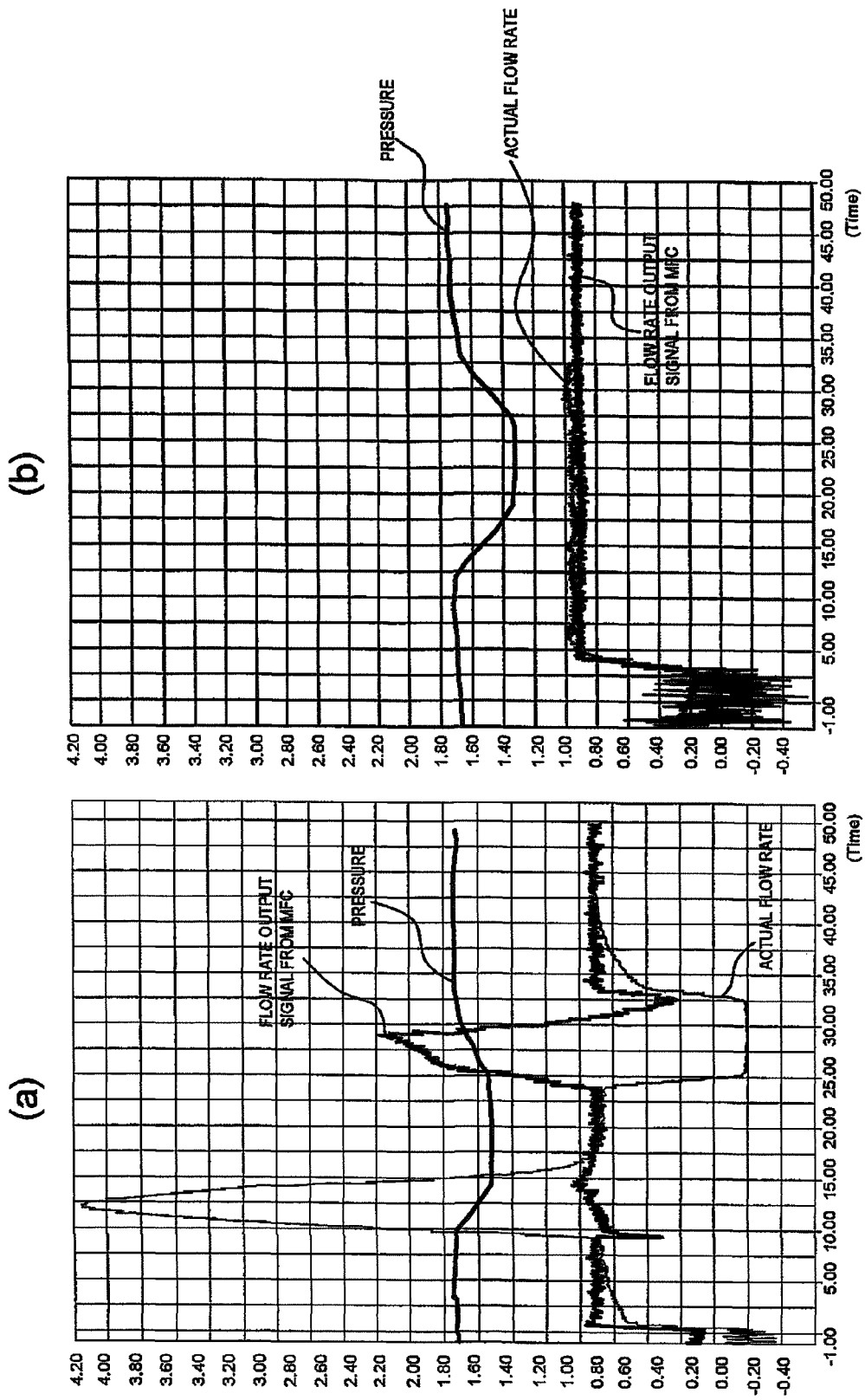
FIG. 7 is a graph showing a result of effect checking and testing (in the case wherein a flow rate measurement value corrected based on a pressure value is used in a stable period).

(i) The case where the measurement value corrected based on the pressure value is used in the stable period FIG. 7 shows a specific effect, and FIG. 6 schematically shows an effect checking and testing system. In FIG. 6, a reference character PC denotes pressure changing means that changes the pressure (primary pressure) applied to the mass flow controller 100, and a reference character R denotes a flow meter that is disposed on the downstream of the mass flow controller 100 and measures the actual flow rate.

For the purpose of comparison, FIG. 7(*a*) shows an exemplary result of flow rate control in the stable period by a conventional mass flow controller that controls the flow rate using only the first function and using the flow rate measurement value for the feed back control without processing.

According to the conventional mass flow controller, if the pressure on the primary side changes (decreases), the flow rate measurement value changes, and the value of the actual flow rate measured with another flow meter R greatly fluctuates. To the contrary, in the case of the mass flow controller 100 according to this embodiment that uses different calculation formulas for the changing period and the stable period (uses the second function in addition to the first function) and corrects the flow rate measurement value based on the pressure value, the actual flow rate is kept substantially constant (see FIG. 7(*b*)).

Figure 8:
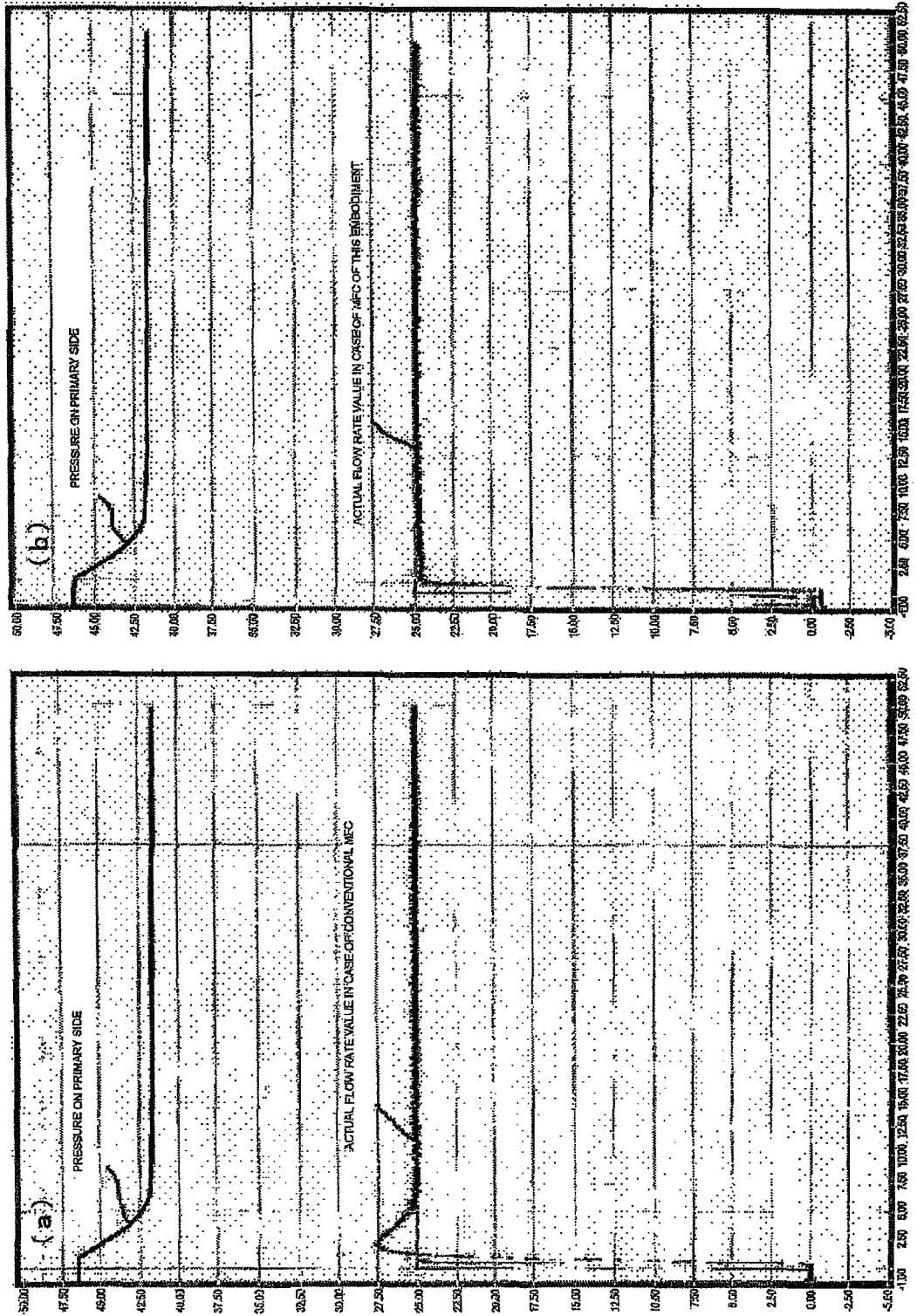
FIG. 8 is a graph showing a result of effect checking and testing (in the case wherein a flow rate measurement value corrected based on a pressure value is used in a changing period).

(ii) The case where the flow rate measurement value corrected based on the pressure value is used in the changing period A specific effect is shown in FIG. 8.

FIG. 8(*b*) shows an exemplary result of flow rate control by the mass flow controller 100 according to the above-mentioned embodiment in the case where the pressure changes in the changing period.

FIG. 8(*a*) shows an exemplary result of flow rate control by the conventional mass flow controller described above for the purpose of comparison.

In FIG. 8, as in FIG. 7, the abscissa axis indicates the time, and the ordinate axis indicates the flow rate value.

In the case of the conventional mass flow controller, a change of the value of the pressure detected by the pressure sensor section 4 significantly affects the actual flow rate, and the actual flow rate overshoots (see FIG. 8(*a*)).

To the contrary, in the case of the mass flow controller 100 according to this embodiment, even if the value of the pressure detected by the pressure sensor 4 changes, the actual flow rate does not change significantly, unlike the case of the conventional mass flow controller. Thus, the effect of the pressure change is substantially reduced compared to the conventional mass flow controller. That is, it can be confirmed that the mass flow controller 100 according to this embodiment can stabilize the actual flow rate even if a pressure change occurs, regardless of whether in the stable period or in the changing period (see FIGS. 7 and 8).

Third Embodiment

The adjusting factor X is set to be a constant value for the formula (5) in the second embodiment, however, the adjusting factor X is set to vary depending on a situation in the third embodiment. The functional block diagram of the third embodiment is omitted to draw because it is the same as that (the same as FIG. 5) of the second embodiment.

Specifically, the adjusting factor X is varied in accordance with the following formulas (7), (8).

In the stable period, $$X = Q1 + Q2 \cdot S \quad (7)$$

In the changing period, $$X = Q1s + Q2s \cdot S \quad (8)$$

In those formulas, the reference characters Q1, Q2, Q1*s*, Q2*s* denote adjusting factors, and the reference character S denotes the flow rate setting value.

Then by setting the adjusting factors appropriately, X increases at least as the flow rate setting value is smaller both in the changing period and in the stable period. This is because the smaller the flow rate setting value is, the more susceptible to the pressure change so that a stronger correction is required.

In addition, X in the stable period is set to be bigger than X in the changing period. This is because a rising responsive waveform is disturbed if the same value of X in the stable period is used as X in the changing period, then the value of X is set to be small so as to weaken a correction, thereby preventing disturbance of the rising responsive waveform.

Figure 9:
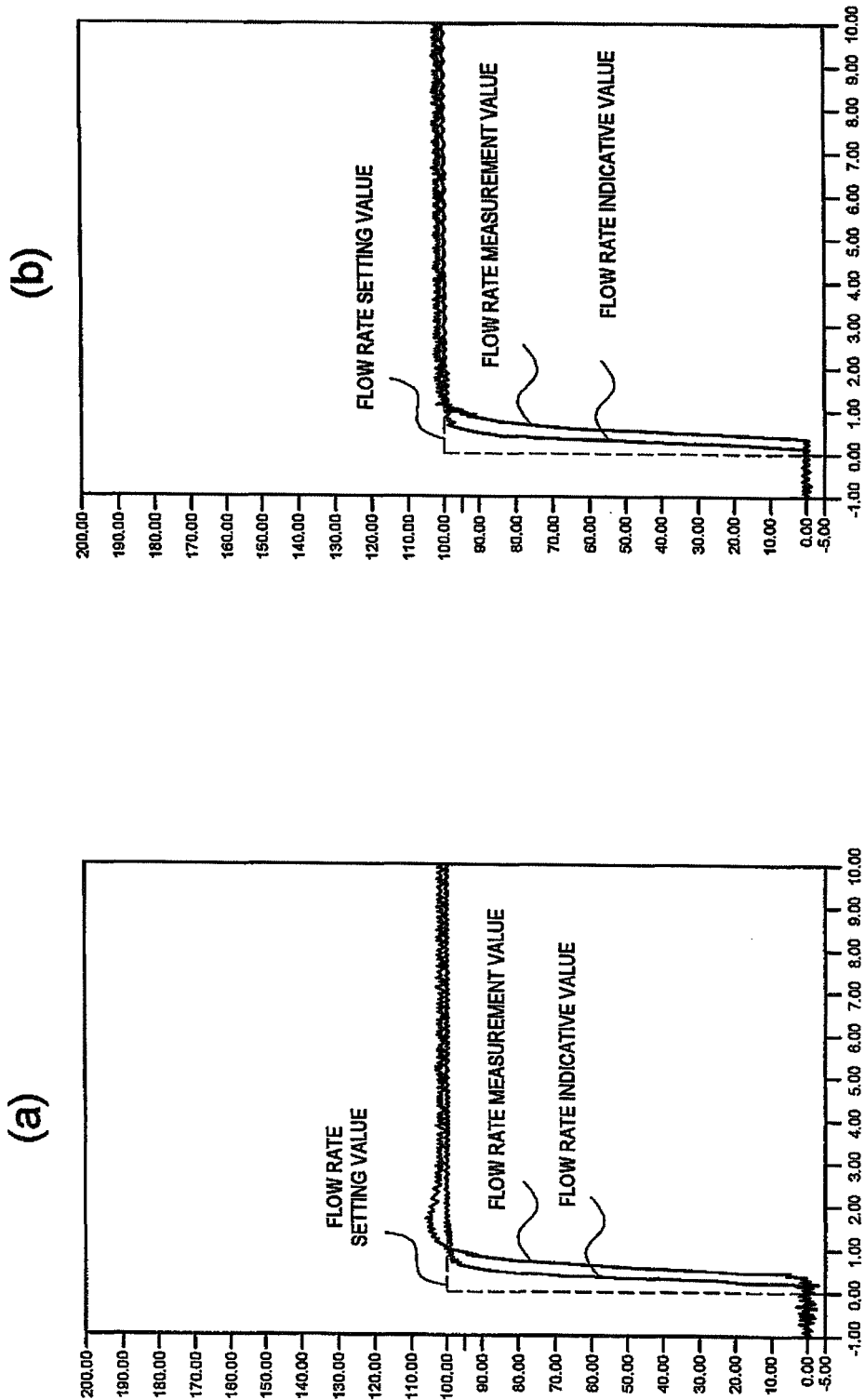
FIG. 9 is a graph showing a result of effect checking and testing according to a third embodiment of the present invention.

FIG. 9 shows a comparison between a case in which the correction by the formulas (5), (7), (8) is performed on the flow rate setting value varied stepwise is shown in FIG. 9(*a*)

and a case in which the correction is not performed on the flow rate setting value is shown in FIG. 9(b). At this time, although the pressure change occurs on the primary side like the second embodiment, if the flow rate measurement value is focused attention on, overshoot is significantly small in case of FIG. 9(b), which shows that the case of FIG. 9(b) is not influenced by the pressure.

FIG. 9 describes also the flow rate indicative value, since a method for calculating the flow rate indicative value is the same as that of the first embodiment except for a point that the flow rate indicative value is corrected by the pressure time differential value irrespective of the stable period or the changing period, and the changing amount of the pressure, an explanation will be omitted.

Forth Embodiment

In the second and third embodiments, the flow rate measurement value is corrected by the pressure, however, in the forth embodiment the flow rate setting value is corrected by the pressure with calculations of addition, subtraction, multiplication and division (specifically calculations of addition and subtraction). In addition, since the functional block diagram is the same as that of the second embodiment (the same as FIG. 5), the functional block diagram is omitted.

The correction expressed by a formula will be as follows.

$$Snew = S + X' \cdot \Delta p \quad (9)$$

In the formula (9), the reference character Snew denotes a flow rate setting value (corrected flow rate setting value) after corrected by the pressure, the reference character S denotes a flow rate setting value, the reference character $\Delta p$ denotes the time differential value of the pressure value detected by the pressure sensor section, and the reference character X' denotes the adjusting factor.

Next, the deviation is obtained between the corrected flow rate setting value and the flow rate measurement value.

The deviation $\epsilon''$ is expressed by the following formula (10).

$$\varepsilon'' = Snew - OUT \quad (10)$$
$$= S + X' \cdot \Delta p - OUT$$
$$= S - OUT + X' \cdot \Delta p$$

Figure 10:
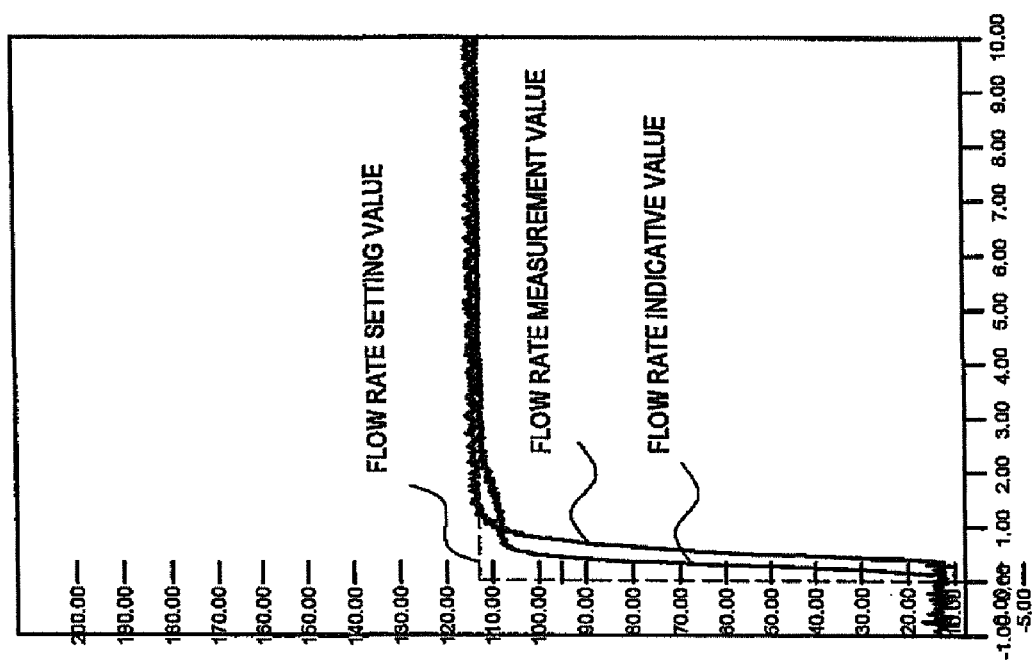
FIG. 10 is a graph showing a result of effect checking and testing according to the third embodiment of the present invention.

FIG. 10 shows a graph of an actually measured value in the forth embodiment. The condition is the same as that of the third embodiment. The overshoot of the flow rate measurement value can be suppressed similar to FIG. 9(b).

On the contrary, since the correction by the pressure is not performed on the flow rate measurement value in this embodiment although the flow rate indicative value is calculated based on the flow rate measurement value, a change in the flow rate indicative value is a little different from that of the third embodiment, as is clear from FIG. 10. In order to stabilize indication, the flow rate indicative value may be indicated based on the corrected flow rate measurement value.

<Others>

Concrete examples of the present invention are indicated in the first~forth embodiment, however, it is to be noted that the present invention is not limited to the embodiments described above.

In each of the above-described embodiments, for example, the correction is performed by adding or subtracting the time differential value of the pressure value multiplied by the adjusting factor to or from the original value, however, the correction may be performed by multiplying or dividing the original value by the time differential value of the pressure value multiplied by the adjusting factor. For example, in the stable period, the control value calculating section $5c2$ calculates the feed back control value based on the calculation formula (3). However, the feed back control value may be calculated based on the following formula (b).

$$V = (P \cdot \epsilon + I \int \epsilon \cdot \delta t + D \cdot \delta \epsilon / \delta t) \cdot \Delta p \cdot Y \quad (11)$$

In addition, the position to which the pressure change contributes, more specifically, the position corrected by the pressure value (the pressure related value) is not limited to three positions such as the feed back control value, the flow rate setting value and the flow rate measurement value as shown in each of the above-mentioned embodiments, the position may be either one position or more in the input/output transmission system from the flow rate sensor section 2 to the flow rate control valve 3.

In addition, it is effective to perform the correction on the flow rate indicative value by the pressure value (the pressure related value).

Furthermore, the above-mentioned correction may not be always performed, and the correction may be performed in the stable period, in the changing period or in a certain period while a condition is further limited among the stable period and the changing period, or if the period changes, the calculation formula for correction (the calculation formula for control in a large sense) may be varied by changing the adjusting factor or the like. With this arrangement, it is possible to perform a favorable and delicate control that matches a characteristic of a product or a characteristic of a whole system to which the product is applied.

Furthermore, the changing period may not be constant, and the changing period may be terminated using trigger means other than a timer. For example, the changing period may be terminated when the deviation of the flow rate measurement value from the flow rate setting value decreases to fall within a certain range.

The function used for each period may be a fixed one or a variable one.

For example, a value of the function used for the changing period (the first function) may be a function that varies gradually (stepwise or continuously) in accordance with time. In this case, if the values of the first and second functions at the time of switching from the changing period to the stable period, that is, the control factors (gain) thereof at the time of switching from the changing period to the stable period are made substantially equal, the flow rate control can be prevented from being unstable due to the change of the control factor at the time of switching from the changing period to the stable period.

In addition, the control valve may be provided on the upstream side of the flow rate sensor section 2. The flow rate sensor section 2 is not limited to the thermal sensor described above and may be other flow rate measuring systems, such as a differential sensor.

In addition, the configurations of other components are not limited to specific ones described with regard to the embodiments described above, and various modifications can be made thereto without departing from the spirit of the present invention.

POSSIBLE APPLICATIONS IN INDUSTRY

As described above, according to the present invention, since the mass flow controller switches the control between the stable period and the changing period, the mass flow controller can suppress a flow rate change without sacrificing the speed of response to a change of the flow rate setting value even if a pressure change occurs and can be used in a system that can generate a disturbance, such as a crosstalk. Furthermore, even if a pressure change occurs in the stable period in which a flow rate change due to a pressure change particularly becomes a problem, the actual flow rate can be further stabilized against the pressure change, because the valve control is performed based on the opening control signal determined by the calculation formula including at least the flow rate measurement value and the flow rate setting value as well as the pressure value obtained by the pressure sensor section.

The invention claimed is:

1. A mass flow controller, comprising:
a flow rate sensor section that measures a flow rate of a fluid flowing through a flow channel and outputs a flow rate measurement signal indicating the measurement value;
a flow rate control valve that is disposed on an upstream side or a downstream side of the flow rate sensor section;
a control section that calculates an opening control signal to be supplied to the flow rate control valve based on a predetermined calculation formula including at least a flow rate measurement value indicated by said flow rate measurement signal and a flow rate setting value, which is a target value, as parameters and outputs said opening control signal; and
a pressure sensor section that detects pressure of said fluid on the upstream side or the downstream side of said flow rate sensor section and outputs a pressure detection signal indicating the pressure value,
wherein said control section uses different calculation formulas for a changing period, which is a predetermined period from a point in time when said flow rate setting value changes by a predetermined amount or more, and a stable period, which is the remaining period, and
at least in said stable period, said calculation formula further includes said pressure value as a parameter,
wherein further comprising:
a flow rate output section that performs a predetermined calculation on said flow rate measurement value and outputs a flow rate indicative value which performs different calculations on the flow rate measurements value in the changing period and the stable period.

2. The mass flow controller according to claim 1, wherein said calculation formula is expressed by the following formula (b):

$$V=(P\cdot\epsilon+I\!\int\epsilon\cdot\delta t+D\cdot\delta\epsilon/\delta t)\cdot Y\cdot\Delta p \quad \text{(b)},$$

In case, $\epsilon=S-OUT$
wherein a reference character V denotes a feed back control value, based on which the opening control signal is set;
reference characters P, I, D and Y denote factors appropriately determined respectively;
reference character S denotes the flow rate setting value, and a reference character OUT denotes the flow rate measurement value; and
reference character $\Delta p$ denotes a time differential value of the pressure value detected by said pressure sensor section or a value expressed by a formula including the time differential value of the pressure value.

3. The mass flow controller according to claim 1, wherein said flow rate output section smoothes said flow rate measurement value with respect to time and outputs the flow rate measurement value smoothed with respect to time in the stable period, and outputs said flow rate measurement value without processing in the changing period.

4. The mass flow controller according to claim 1, wherein said flow rate output section calculates said flow rate indicative value based on said flow rate measurement value using at least a time differential value of the pressure value detected by said pressure sensor section as a parameter.

5. The mass flow controller according to claim 1, wherein said changing period is always set to be constant.

6. The mass flow controller according to claim 1, wherein said changing period is set to terminate at a time when the deviation of the flow rate measurement value from the flow rate setting value decreases to fall within a certain range.

7. A mass flow controller comprising:
a flow rate sensor section that measures a flow rate of a fluid flowing through a flow channel and outputs a flow rate measurement signal indicating the measurement value;
a flow rate control valve that is disposed on an upstream side or a downstream side of the flow rate sensor section;
a control section that calculates an opening control signal to be supplied to the flow rate control value based on a predetermined calculation formula including at least a flow rate measurement value indicated by said flow rate measurement signal and a flow rate setting value, which is a target value, as parameters and outputs said opening control signal; and
a pressure sensor section that detects pressure of said fluid on the upstream side or the downstream side of said flow rate sensor section and outputs a pressure detection signal indicating the pressure value,
wherein said control section uses different calculation formulas for a changing period, which is a predetermined period from a point in time when said flow rate setting value changes by a predetermined amount or more, and a stable period, which is the remaining period, and
at least in said stable period, said calculation formula further includes said pressure value as a parameter,
wherein said calculation formula is expressed by the following formula (a):

$$V=P\cdot\epsilon+I\!\int\epsilon\cdot\delta t+D\cdot\delta\epsilon/\delta t+Y\cdot\Delta p \quad \text{(a)},$$

In case, $\epsilon=S-OUT$
wherein a reference character V denotes a feed back control value, based on which the opening control signal is set;
reference characters P, I, D and Y denote factors appropriately determined respectively;
reference character S denotes the flow rate setting value, and a reference character OUT denotes the flow rate measurement value; and
reference character $\Delta p$ denotes a time differential value of the pressure value detected by the pressure sensor section or a value expressed by a formula including the time differential value of the pressure value.

8. A mass flow controller comprising:
a flow rate sensor section that measures a flow rate of a fluid flowing through a flow channel and outputs a flow rate measurement signal indicating the measurement value;

a flow rate control valve that is disposed on an upstream side or a downstream side of the flow rate sensor section;

a control section that calculates an opening control signal to be supplied to the flow rate control value based on a predetermined calculation formula including at least a flow rate measurement value indicated by said flow rate measurement signal and a flow rate setting value, which is a target value as parameters and outputs said opening control signal; and a pressure sensor section that detects pressure of said fluid on the upstream side or the downstream side of said flow rate sensor section and outputs a pressure detection signal indicating the pressure value, wherein said control section uses different calculation formulas for a changing period, which is a predetermined period from a point in time when said flow rate setting value changes by a predetermined amount or more, and a stable period, which is the remaining period, and at least in said stable period, said calculation formula further includes said pressure value as a parameter wherein said calculation formula is expressed by the following formula (c):

$$V = P \cdot \epsilon' + I \int \epsilon' \cdot \delta t + D \cdot \delta \epsilon' / \delta t \quad (c),$$

In case, $\epsilon' = h(S, OUT, \Delta p)$ wherein a reference character V denotes a feed back control value, based on which the opening control signal is set;

reference characters P, I, and D denote factors appropriately determined respectively;

reference character S denotes the flow rate setting value, and a reference character OUT denotes the flow rate measurement value;

reference character $\Delta p$ denotes a time differential value of the pressure value detected by said pressure sensor section or a value expressed by a formula including the time differential value of the pressure value; and reference character h is a function using at least S, OUT, and $\Delta p$ as parameters.

9. The mass flow controller according to claim 8, wherein said $\epsilon'$ is expressed by the following formula (d) or (e):

$$\epsilon' = S - (OUT + X \cdot \Delta p) \quad (d)$$

$$\epsilon' = S - (OUT \cdot X \cdot \Delta p) \quad (e)$$

wherein X denotes a factor appropriately determined.

10. The mass flow controller according to claim 8, wherein said $\epsilon'$ is expressed by the following formula (f) or (g):

$$\epsilon' = (S \cdot X \cdot \Delta p) - OUT \quad (f)$$

$$\epsilon' = (S - X \cdot \Delta p) - OUT \quad (g)$$

where X denotes a factor appropriately determined.

* * * * *